Oct. 27, 1931.  J. W. BLUE  1,829,335
SOD CUTTER
Filed Nov. 13, 1930   2 Sheets-Sheet 1
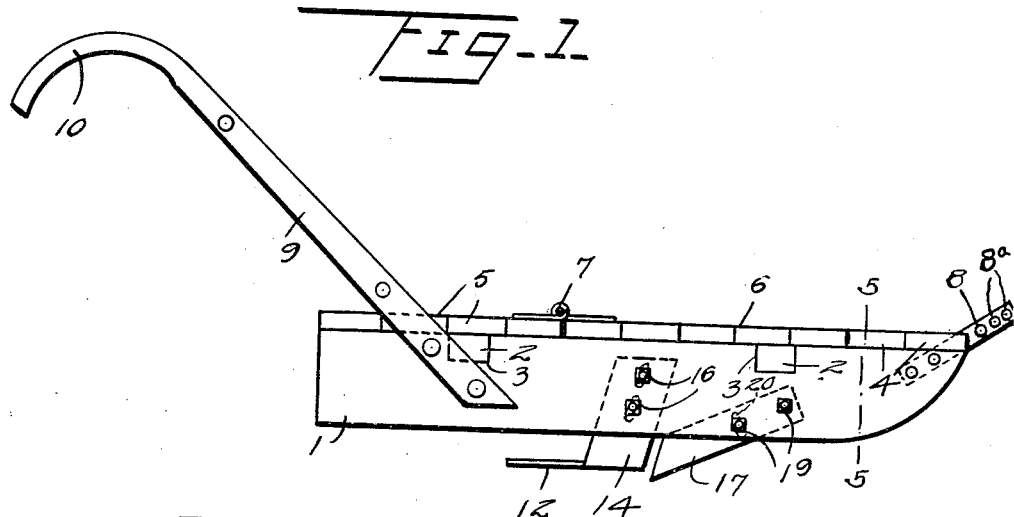
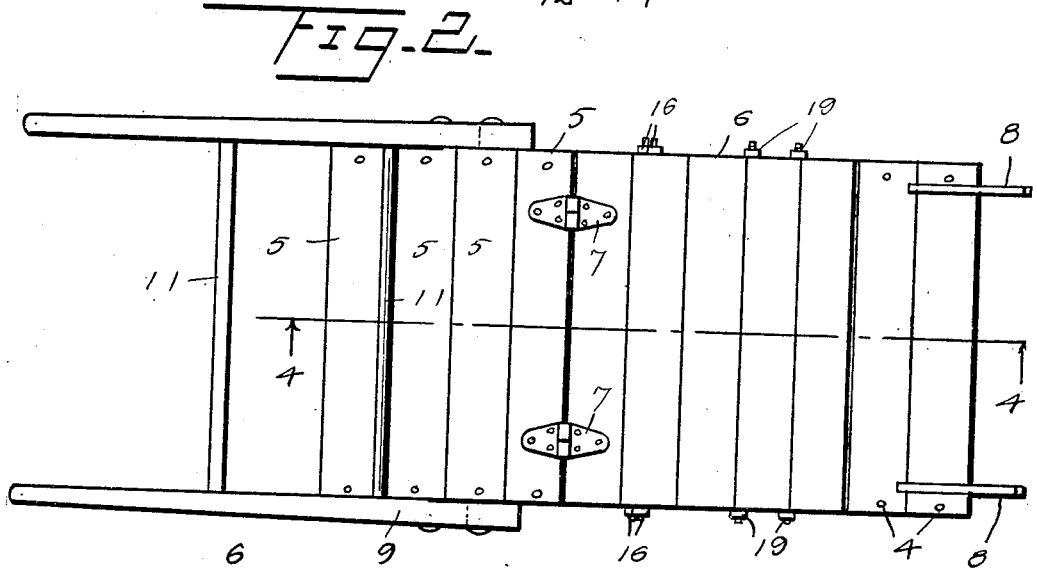
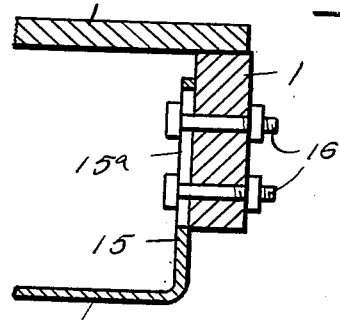
Inventor
J. W. Blue
By Watson E. Coleman
Attorney

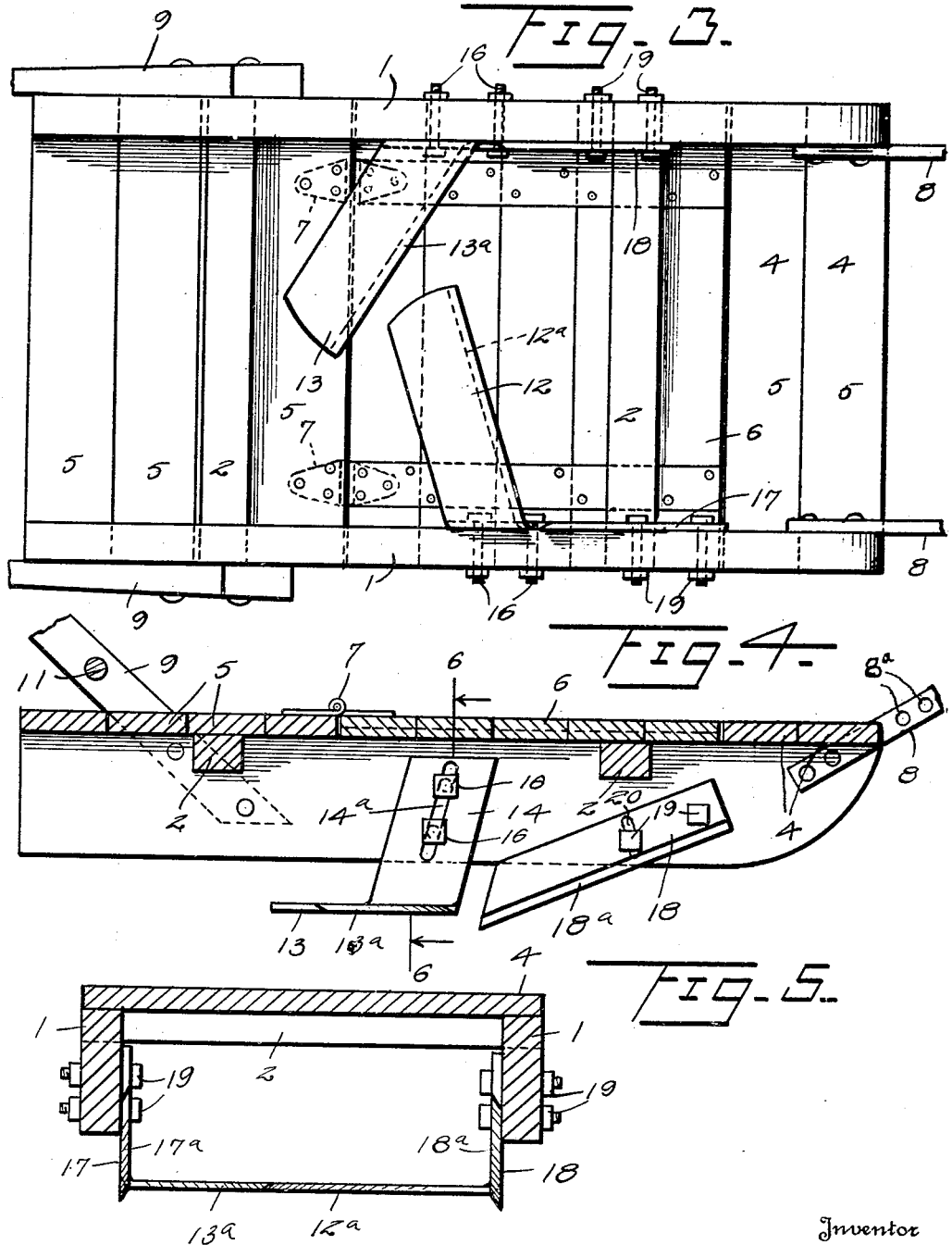

Patented Oct. 27, 1931

1,829,335

UNITED STATES PATENT OFFICE

JAMES W. BLUE, OF FIFE LAKE, MICHIGAN

SOD CUTTER

Application filed November 13, 1930. Serial No. 495,511.

This invention relates to sod cutters, and has for one of its objects to provide a novel machine of this character which shall be adapted to cut sod in strips, which shall be adapted to prevent dead grass and the like from turning or rolling up the side edges of the strips, which will not become clogged by roots or the like, and which shall be adjustable to adapt it for cutting sod of different thickness.

The invention has for a further object to provide a machine of the character stated which shall be simple and durable and capable of being manufactured and sold at a comparatively low cost.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of a sod cutter constructed in accordance with my invention.

Figure 2 is a top plan view of the sod cutter.

Figure 3 is a bottom plan view of the sod cutter.

Figure 4 is a sectional view taken on the vertical plane indicated by the line 4—4 of Figure 2.

Figure 5 is a sectional view taken on the vertical plane indicated by the line 5—5 of Figure 1, and Figure 6 is a sectional view taken on the vertical planes indicated by the line 6—6 of Figure 4.

The sod cutter comprises side bars 1 which are adapted to rest upon and travel over a surface of the sod, and these parts or runners are secured together in spaced parallel relation by cross bars 2. The cross bars 2 have their end portions positioned and secured in recesses 3 formed in the runners 1, and the upper sides thereof are arranged in alinement with the upper edges of the runners. The runners 1 are also connected by front boards 4 and rear boards 5 which are terminally secured to the upper edges of the runners. The boards 4 and 5, and a door 6 close the upper side of the sod cutter. The door 6 is arranged between the front boards 4 and rear boards 5, rests upon the runners 1, and is secured by hinges 7 to the foremost of the rear boards 5. Clevises 8 are secured to the front ends of the runners 1, and handle bars 9 are secured to and extend upwardly and rearwardly from the rear end portions of the runners. The handle bars 9 are secured to the outer sides of the rear end portions of the runners, and are provided with upwardly and rearwardly curved grips 10, and are connected by bars 11. These parts constitute a movable support for the cutter mechanism of the machine which mechanism comprises blades adapted to cut a strip from the sod and blades adapted to sever the strip from the soil. The clevises 8 are provided with longitudinal series of openings 8a to permit the draft means, not shown, to be connected to the clevises at different distances from the bottoms of the runners 1 and thus adapt the sod cutter for hard or soft soil.

Horizontally disposed blades 12 and 13 extend upwardly and rearwardly from the lower ends of shanks 14 and 15, respectively, which contact with the inner sides of the runners 1 and are secured to the runners by bolts 16. The blades 12 and 13 have their front edges bevelled as at 12a and 13a, respectively, to provide cutting edges. The inner or free end portions of the blades 12 and 13 extend in opposite directions beyond each other and the longitudinal center of the sod cutter, and the inner end portion of the blade 12 is spaced forwardly of the corresponding end portion of the blade 13. The blades are located below the lower edges of the runners 1, and to permit their distance from these edges to be varied and thus adapt the machine for cutting sod of different thickness, the blade shanks 14 and 15 are provided with longitudinal slots 14a and 15a for the reception of the bolts 16. Vertical blades 17 and 18 which are arranged in advance of the outer ends of the cutting edges of the blades 12 and 13, respectively, are positioned against the inner sides of the runners 1 and are secured to the runners by bolts 19. The blades 17 and 18 incline downwardly and rearwardly, and have their lower edges bevelled, as at 17a and 18a, respectively, to provide cutting edges. The lower or rear ends of the blades 17 and 18 are located in a plane below the blades 12 and 13, and the blades 17 and 18 are provided with slots 20 in order to permit them to be adjusted as the blades 12 and 13 are adjusted so that their lower or rear ends will be located below the blades 12 and 13 in any adjusted position of these blades.

In practice, as the machine is drawn over the sod, the blades 17 and 18 cut a strip from the sod, and the blades 12 and 13 separate the strip of sod from the soil. The blades 17 and 18, in addition to cutting a strip from the sod sever dry grass and the like at the edges of the strip, and in view thereof the side edges of the strip will not turn or roll up when the strip is separated from the soil by the blades 12 and 13. As the inner or free ends of the blades 12 and 13 extend in opposite directions beyond each other, the strip will be severed completely from the soil, and it will not, as the result thereof, break when rolled. The spacing of the inner or free end portions of the blades 12 and 13 permits roots and the like to pass between the blades, and in view thereof the machine will not become clogged. As the lower or rear ends of the blades 17 and 18 are located below the blades 12 and 13, the blades 17 and 18 will cut deeper than the thickness of the sod, and in view thereof the blades 12 and 13 will readily separate the strip of sod from the soil. The door 6 is located directly over the blades, and when it is raised the blades are readily accessible for adjustment, sharpening and the like.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

A sod cutter comprising runners, front and rear cover sections secured upon the runners, a door positioned between said sections upon the runners and hinged to one of said sections, horizontal blades located below the door and extending inwardly from the runners, and vertical blades located below the door and extending downwardly and rearwardly and having their lower ends arranged in advance of and below the outer ends of said first blades.

In testimony whereof I hereunto affix my signature.

JAMES W. BLUE.